US012619318B2

(12) United States Patent
Uehara et al.

(10) Patent No.: US 12,619,318 B2
(45) Date of Patent: May 5, 2026

(54) DISPLAY DEVICE

(71) Applicant: Japan Display Inc., Tokyo (JP)

(72) Inventors: Toshinori Uehara, Tokyo (JP); Muneaki Zako, Tokyo (JP); Keiji Tago, Tokyo (JP); Tenfu Nakamura, Tokyo (JP)

(73) Assignee: Japan Display Inc., Tokyo (JP)

( * ) Notice: Subject to any disclaimer, the term of this patent is extended or adjusted under 35 U.S.C. 154(b) by 75 days.

(21) Appl. No.: 18/745,182

(22) Filed: Jun. 17, 2024

(65) Prior Publication Data

US 2024/0419253 A1 Dec. 19, 2024

(30) Foreign Application Priority Data

Jun. 19, 2023 (JP) ................................. 2023-099800

(51) Int. Cl.
*G06F 3/01* (2006.01)

(52) U.S. Cl.
CPC ........ *G06F 3/017* (2013.01); *G06F 2203/011* (2013.01)

(58) Field of Classification Search
None
See application file for complete search history.

(56) References Cited

U.S. PATENT DOCUMENTS

| | | | |
|---|---|---|---|
| 2013/0265232 A1 | 10/2013 | Yun et al. | |
| 2023/0135420 A1* | 5/2023 | Lee ..................... | G06F 3/04817 |
| | | | 345/156 |
| 2023/0298294 A1* | 9/2023 | Hayata ..................... | G06T 7/20 |
| | | | 345/419 |
| 2023/0315370 A1* | 10/2023 | Hayata ..................... | G06F 3/14 |
| | | | 345/156 |

FOREIGN PATENT DOCUMENTS

| | | | | |
|---|---|---|---|---|
| CN | 114143494 A | * | 3/2022 | ............. H04N 7/142 |
| JP | 2015518580 A | | 7/2015 | |

* cited by examiner

*Primary Examiner* — Duane N Taylor, Jr.
(74) *Attorney, Agent, or Firm* — K&L Gates LLP

(57) ABSTRACT

A display device includes a first camera that captures an image of a first viewer present in a first normal direction of a display surface of a transparent display, a second camera that captures an image of a second viewer present in a second normal direction of the display surface of the transparent display, the second normal direction being an opposite direction of the first normal direction, a microphone, and a control circuit that includes a user coordinate calculation circuit, a gesture detection circuit, a dictation circuit, and a drawing information generation circuit. The user coordinate calculation circuit specifies positions of the first viewer and the second viewer on the basis of the images from the first camera and the second camera. When the gesture detection circuit determines that the first viewer utters sound, the dictation circuit generates a character based on sound information from the microphone, and the generated character is displayed on the transparent display toward the second viewer by the drawing information generation circuit.

5 Claims, 13 Drawing Sheets

F I G . 1
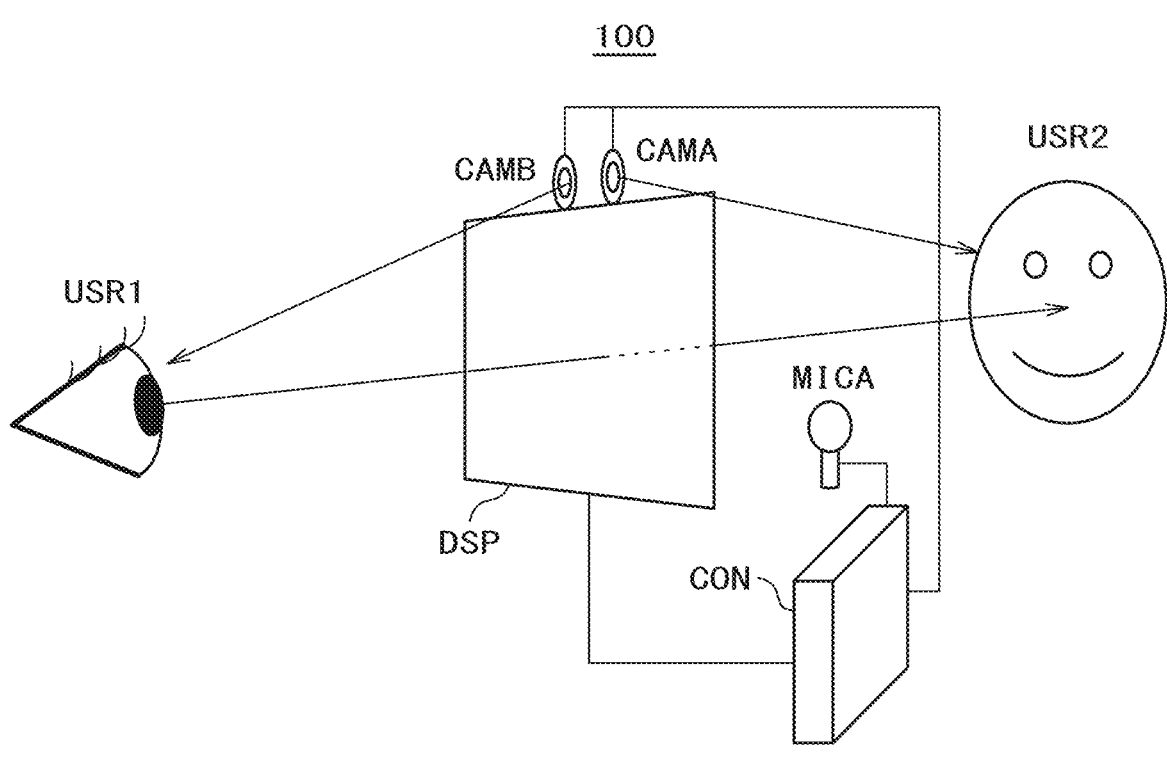

F I G . 2
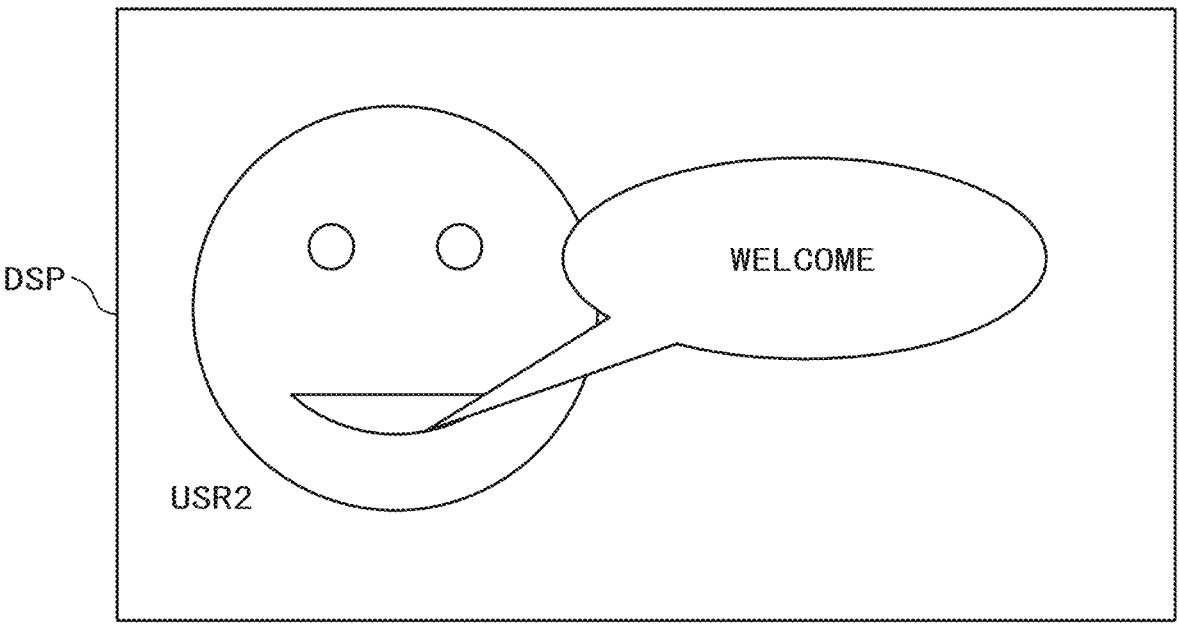

F I G . 3
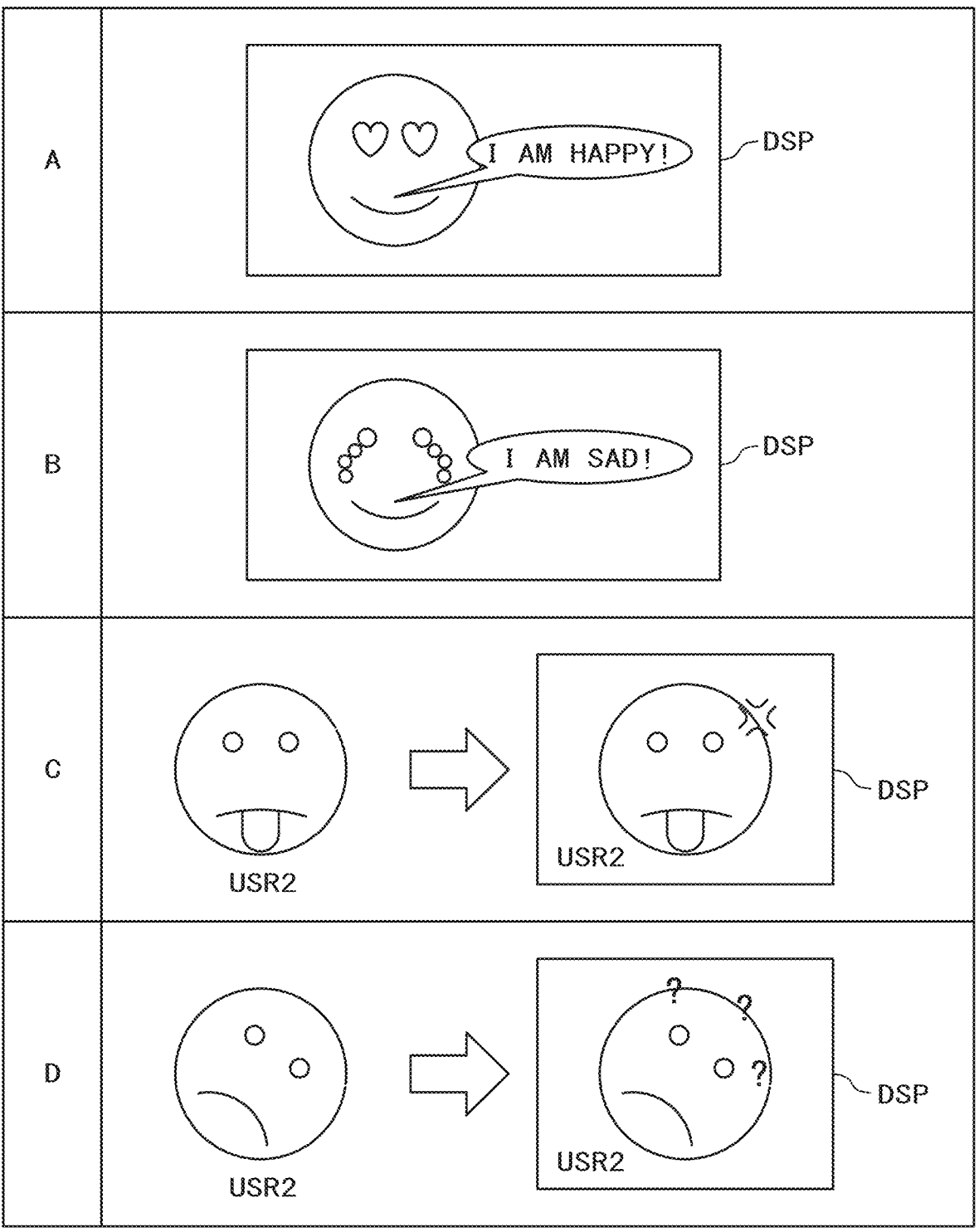

S10 — USER 1
DETECT LINE-OF-SIGHT
POSITION

S11 — USER 2
DETECT FACE
COORDINATES

S12 — USER 2
DETECT GESTURE

S13 — USER 2
DICTATE

S14 — USER 2
DETECT KEYWORD

S15 — GENERATE DRAWING
INFORMATION

S16 — OUTPUT TO TRANSPARENT
DISPLAY

F I G . 6
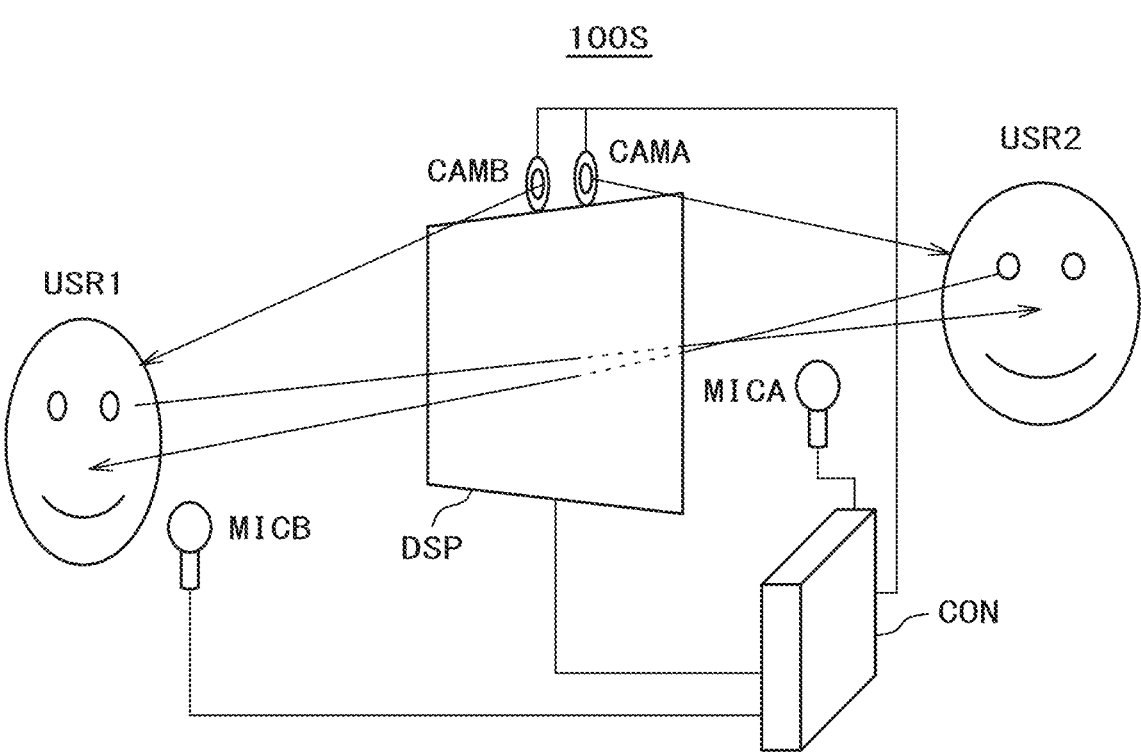

F I G . 8
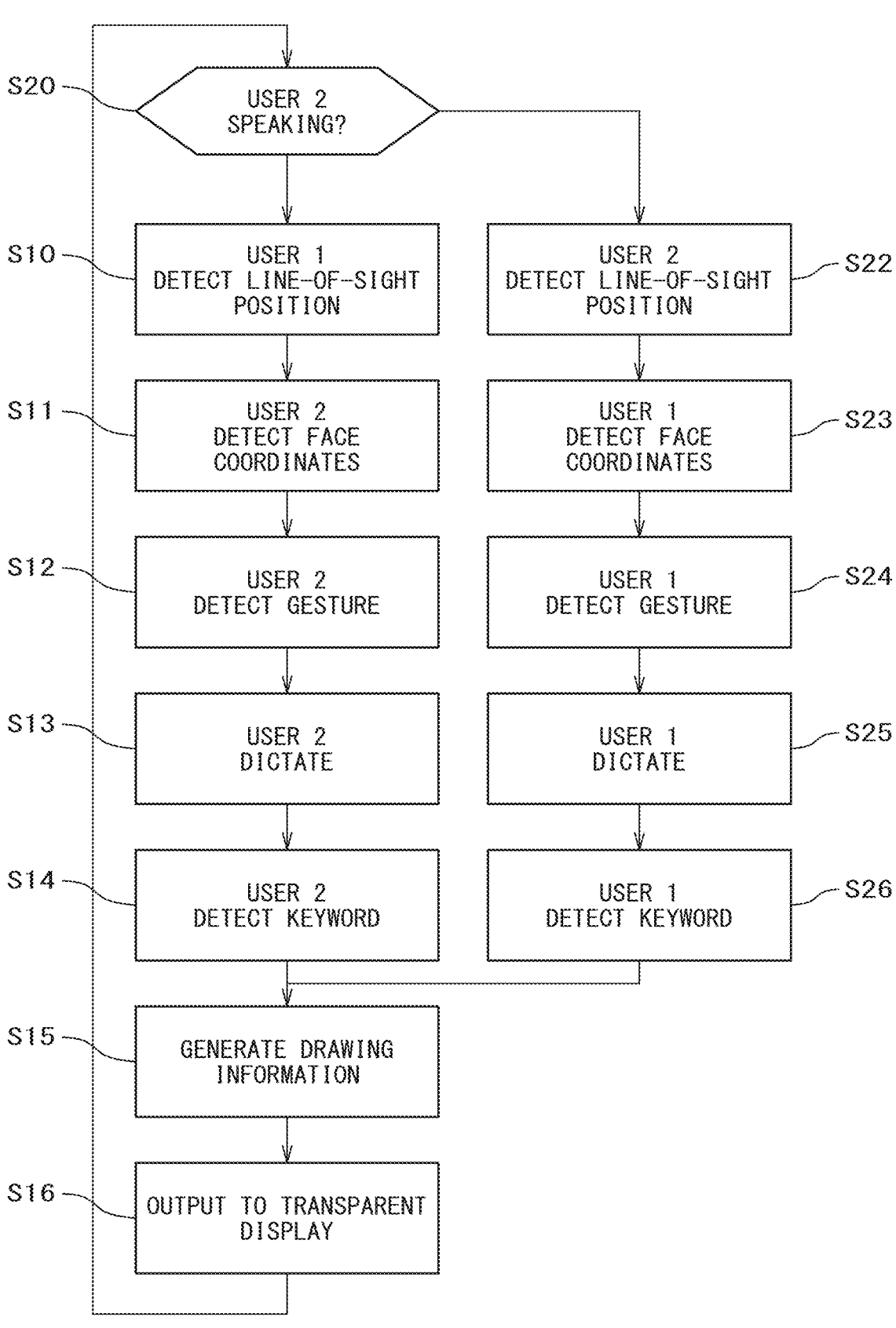

F I G . 9

F I G . 1 4
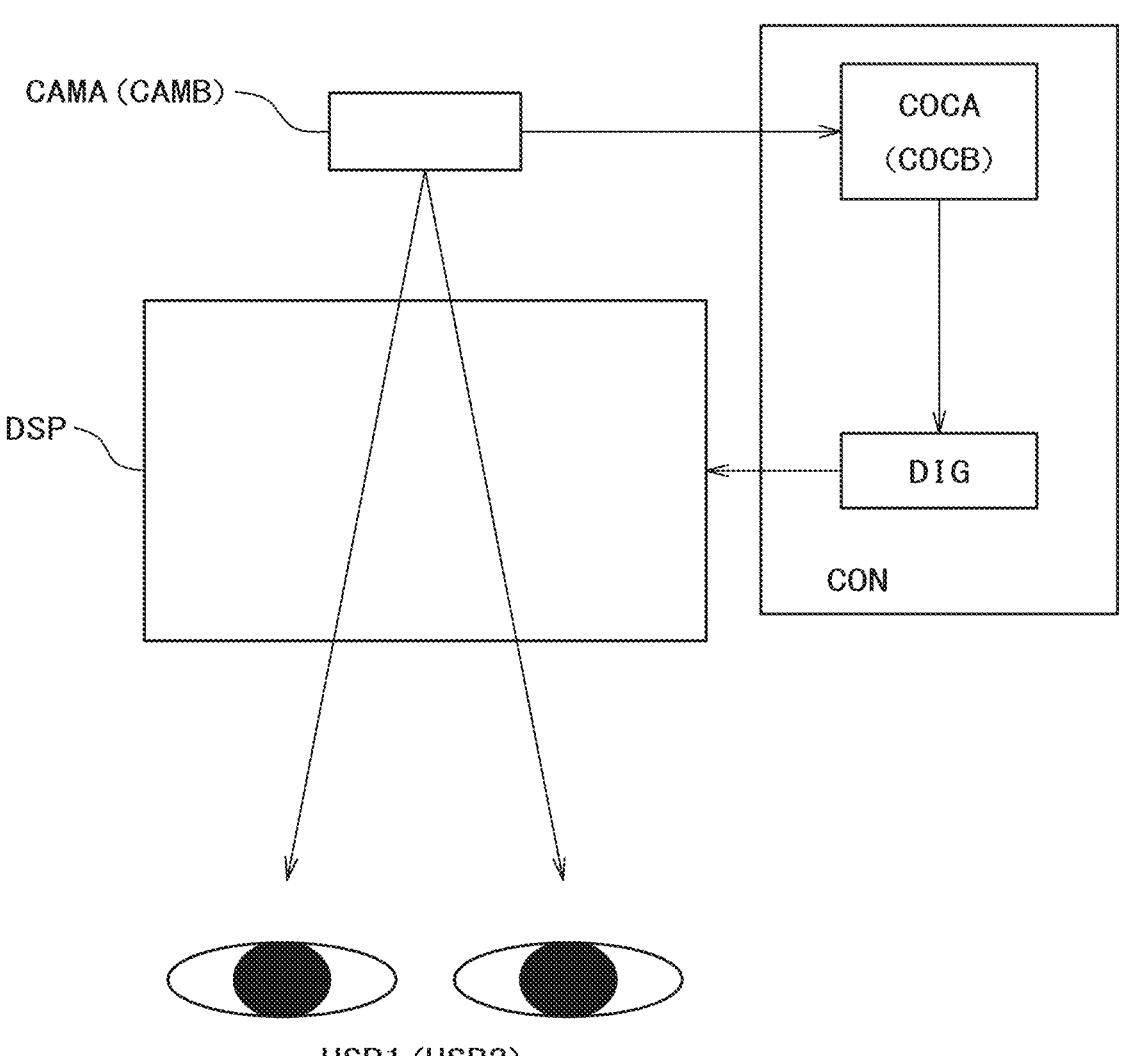

DISPLAY DEVICE

CLAIM OF PRIORITY

The present application claims priority from Japanese Patent Application JP 2023-99800 filed on Jun. 19, 2023, the content of which is hereby incorporated by reference into this application.

BACKGROUND OF THE INVENTION

1. Field of the Invention

The present disclosure relates to a display device and is applicable particularly to a display device provided with a transparent display.

2. Description of the Related Art

In a case in which a transparent display is used by two users in a face-to-face manner, for example, a first user can view required information via a screen of the transparent display while viewing a rear surface background (for example, a second user) positioned on a rear side of the transparent display.

As a proposal relating to the transparent display and a display method thereof, there exists JP-T-2015-518580.

SUMMARY OF THE INVENTION

The present disclosers have examined the present disclosure by studying a technology for achieving a face-to-face communication through use of augmented reality when the transparent display is used in a face-to-face manner.

An objective of the present disclosure is to provide a technology which achieves a face-to-face communication through use of augmented reality in a face-to-face use of a transparent display.

Other problems and novel features will become apparent from the description of the present specification and the accompanying drawings.

An overview of a representative one of the present invention is briefly described as follows.

That is, a display device includes a transparent display, a first camera that captures an image of a first viewer present in a first normal direction of a display surface of the transparent display, a second camera that captures an image of a second viewer present in a second normal direction of the display surface of the transparent display, the second normal direction being an opposite direction of the first normal direction, a microphone, and a control circuit that includes a user coordinate calculation circuit, a gesture detection circuit, a dictation circuit, and a drawing information generation circuit. The user coordinate calculation circuit specifies positions of the first viewer and the second viewer on the basis of the images from the first camera and the second camera. The gesture detection circuit determines which of the first viewer and the second viewer is uttering sound. When the gesture detection circuit determines that the first viewer utters sound, the dictation circuit generates a character based on sound information from the microphone, and the generated character is displayed on the transparent display toward the second viewer by the drawing information generation circuit.

BRIEF DESCRIPTION OF THE DRAWINGS

FIG. 1 is a view for describing an overall configuration example of a display device according to an embodiment;

FIG. 2 is a view for describing a display example on a transparent display used for the display device of FIG. 1;

FIG. 3 is a diagram for describing display examples of the transparent display in a face-to-face communication through use of augmented reality according to the embodiment;

FIG. 6 is a view for describing an overall configuration example of a display device according to an embodiment;

FIG. 8 is a flowchart for describing an operation flow of the display device according to the embodiment;

FIG. 9 is a diagram for illustrating main components of the transparent display;

FIG. 14 is a schematic diagram of a configuration example of eye tracking.

DETAILED DESCRIPTION OF THE PREFERRED EMBODIMENTS

A description is given as each embodiment of the present invention with reference to the drawings.

It is to be noted that the present disclosure is merely an example. It should be understood that appropriate changes easily conceived by a person skilled in the art while maintaining the gist of the present invention are included in the scope of the present invention. Moreover, the drawings may be schematically illustrated compared with an actual form in terms of a width, a thickness, a shape, and the like of each portion for the sake of a clearer description, but are merely examples, and do not limit the interpretation of the present invention.

In addition, in this specification and each drawing, an element similar to that described before in relation to a drawing already described is denoted by the same reference symbol, and a detailed description thereof may appropriately be omitted.

Embodiments

Figure 4:
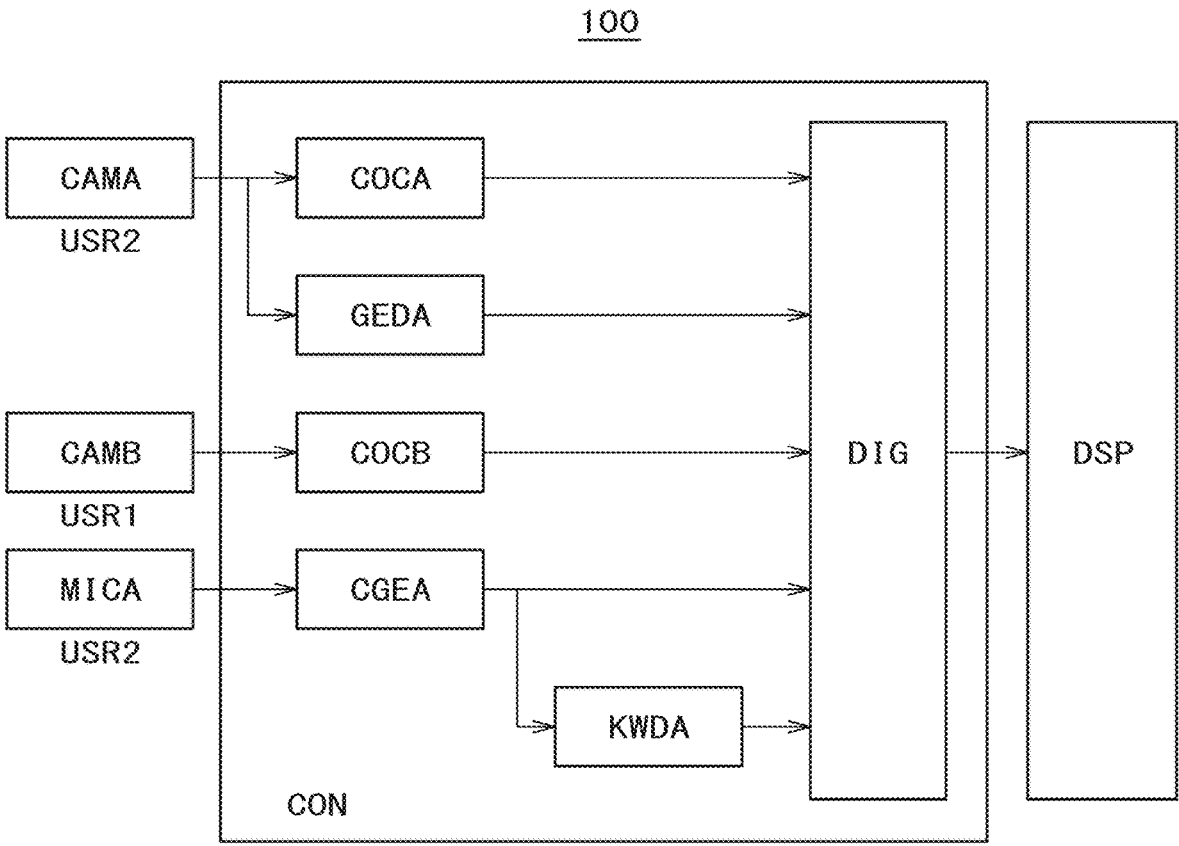
FIG. 4 is an overall block diagram of the display device according to the embodiment.
Figure 5:
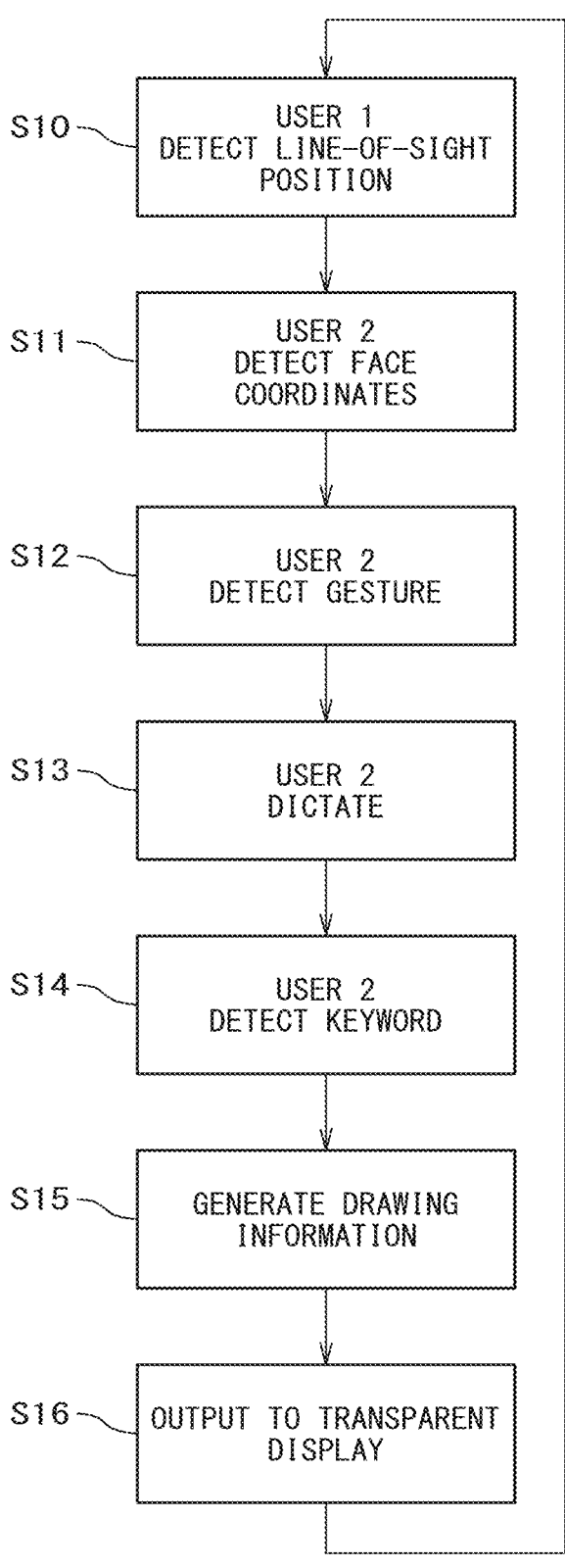
FIG. 5 is a flowchart for describing an operation flow of the display device according to the embodiment.

A description is given as embodiments (examples) according to the present disclosure by use of the drawings. FIG. 1 is a view for describing an overall configuration example of a display device according to an embodiment. FIG. 2 is a view for describing a display example on a transparent display used for the display device of FIG. 1. FIG. 3 is a diagram for describing display examples of the transparent display in a face-to-face communication through use of augmented reality according to the embodiment. FIG. 4 is an overall block diagram of the display device according to the embodiment. FIG. 5 is a flowchart for describing an operation flow of the display device according to the embodiment.

As illustrated in FIG. 1, a display device 100 includes a transparent display DSP, a first camera CAMA, a second camera CAMB, a first microphone MICA, and a control circuit CON.

The transparent display DSP may include a display panel employing, for example, polymer dispersed liquid crystal (hereinafter sometimes referred to as "PDLC").

The first camera CAMA captures an image of a second user (opposite party: second viewer) USER2 present in a first normal direction of a display surface of the transparent display DSP. The second camera CAMB captures an image of a first user (user: first viewer) USER1 present in a second normal direction of the display surface of the transparent display DSP, the second normal direction being an opposite direction of the first normal direction. The first microphone MICA detects sound of the second user USR2.

The control circuit CON is electrically connected to the transparent display DSP, the first camera CAMA, the second camera CAMB, and the first microphone MICA. The control circuit CON can detect position coordinates of the face of the second user USR2 and the line of sight of the second user USR2 on the basis of the image of the second user USR2 captured by the first camera CAMA. Moreover, the control circuit CON can detect position coordinates of the face of the first user USR1 and the line of sight of the first user USR1 on the basis of the image of the first user USR1 captured by the second camera CAMB.

In a description given below, the description is given while assuming that the second user USR2 (opposite party: second viewer) is captured by the first camera CAMA and the first user USR1 (user: first viewer) is captured by the second camera CAMB. However, needless to say, it should be understood that the user captured by the first camera CAMA may be the first user USR1 (user: first viewer) and the user captured by the second camera CAMB may be the second user USR2 (opposite party: second viewer).

FIG. 2 illustrates a display example of the transparent display DSP in a case in which the first user USR1 views the second user USR2 via the transparent display DSP. As illustrated in FIG. 2, words spoken by the second user USR2 are dictated, a speech balloon is displayed at a position of the mouth of the second user USR2 as viewed from the first user USR1, and characters are displayed in the speech balloon. In this example, character information "WELCOME" is displayed in the speech balloon.

There is provided such a configuration that the display position of the speech balloon is outside of the position coordinates of the second user USR2 as viewed from the first user USR1. That is, the control circuit CON includes a dictation circuit (corresponding to CGEA of FIG. 4 described later) which generates characters based on the sound information from the first microphone MICA, and displays the generated characters in such a manner as to be directed toward the first user USR1 on the transparent display DSP. It is preferred that a display position of the characters, that is, a display position of the speech balloon in which the characters are displayed (drawn), be outside position coordinates indicating an area of the transparent display DSP in which the face of the second user USR2 is displayed in a transmissive manner as viewed from the first user USR1. As a result, recognition of the characters displayed in the speech balloon is promoted as viewed from the first user USR1. Thus, when the transparent display DSP is used in a face-to-face manner, a face-to-face communication through use of augmented reality can be achieved.

FIG. 3 illustrates four display examples (A, B, C, and D) of the transparent display DSP in a case in which the first user USR1 views the second user USR2 via the transparent display DSP.

The display examples A and B of FIG. 3 are display examples in each of which the control circuit CON recognizes a keyword or a context on the basis of characters or a sentence dictated from a word spoken by the second user USR2 and displays an optional effect in a portion of the face of the second user USR2 displayed in a transmissive manner on the transparent display. The display example A of FIG. 3 is a display example in which character information "I AM HAPPY" is displayed in the speech balloon and such an effect that portions of the eyes of the face of the second user USR2 appear as heart shapes is displayed on the basis of this character information. The display example B of FIG. 3 is a display example in which character information "I AM SAD" is displayed in the speech balloon and such an effect that the eyes of the face of the second user USR2 appear as eyes shedding tears is displayed on the basis of this character information. That is, the control circuit CON includes a keyword detection circuit (corresponding to KWDA of FIG. 4 described later) capable of recognizing and detecting a keyword or a context.

Each of the display examples C and D of FIG. 3 is an example in which the control circuit CON analyzes the image captured by the first camera CAMA, thereby detecting a gesture or an expression of the face of the second user USR2, and displays an optional effect in a portion of the face of the second user USR2 displayed in a transmissive manner on the transparent display. The display example C of FIG. 3 is a display example in which such an effect that the second user USR2 appears angry is displayed through image analysis of the captured image of an angry face of the second user USR2. The display example D of FIG. 3 is a display example in which such an effect that the second user USR2 appears as questioning is displayed through image analysis of the captured image of a questioning face of the second user USR2. That is, the control circuit CON includes a gesture detection circuit (corresponding to GEDA of FIG. 4 described later) capable of detecting a gesture or an expression of the face.

FIG. 4 illustrates a block diagram of the control circuit CON. The control circuit CON includes a first user coordinate calculation circuit COCA, a first gesture detection circuit GEDA, a second user coordinate calculation circuit COCB, a first dictation circuit CGEA, a first keyword detection circuit KWDA, and a drawing information generation circuit DIG.

The first user coordinate calculation circuit COCA is electrically coupled to the first camera CAMA and can detect the position coordinates of the face of the second user USR2 and the line of sight of the second user USR2 on the basis of the image of the second user USR2 captured by the first camera CAMA. That is, the first user coordinate calculation circuit COCA can specify the position of the second user USR2.

The first gesture detection circuit GEDA is electrically coupled to the first camera CAMA and can detect a gesture or an expression of the face of the second user USR2 on the basis of the image of the second user USR2 captured by the first camera CAMA. Moreover, the first gesture detection circuit GEDA can determine whether or not the second user USR2 is uttering sound. The first gesture detection circuit GEDA can be configured to have a machine learning function (AI). As a result, the first gesture detection circuit GEDA can learn many gestures and expressions of faces, thereby accurately determining emotion from a gesture or an expression of the face of the second user USR2. Accordingly, the display examples described in FIG. 3 can be caused to be displayed on the transparent display DSP.

The second user coordinate calculation circuit COCB is electrically coupled to the second camera CAMB and can detect the position coordinates of the face of the first user USR1 and the line of sight of the first user USR1 on the basis of the image of the first user USR1 captured by the second camera CAMB. That is, the second user coordinate calculation circuit COCB can specify the position of the first user USR1.

The first dictation circuit CGEA is electrically coupled to the first microphone MICA and can generate characters (character information) based on sound information of words that are spoken by the second user USR2 and are detected by the first microphone MICA.

The first keyword detection circuit KWDA can recognize and detect a keyword or a context for the characters generated by the first dictation circuit CGEA.

The drawing information generation circuit DIG is electrically connected to the first user coordinate calculation circuit COCA, the first gesture detection circuit GEDA, the second user coordinate calculation circuit COCB, the first dictation circuit CGEA, and the first keyword detection circuit KWDA. To the drawing information generation circuit DIG, a detection result of the first user coordinate calculation circuit COCA, a detection result of the first gesture detection circuit GEDA, a detection result of the second user coordinate calculation circuit COCB, characters generated by the first dictation circuit CGEA, and a detection result of the first keyword detection circuit KWDA are input. The drawing information generation circuit DIG generates drawing information to be drawn on the transparent display DSP, on the basis of the input detection results and characters, and transmits the generated drawing information to the transparent display DSP. As a result, for example, the display directed toward the first user USR1 can be executed on the transparent display DSP as described with reference to FIG. 2. That is, the drawing information generation circuit DIG generates such drawing information that a speech balloon is displayed at the position of the mouth of the second user USR2 and the characters generated by the first dictation circuit CGEA are displayed in the speech balloon as viewed from the first user USR1, and supplies the drawing information to the transparent display DSP.

For example, it is possible to operate the display device 100 such that, when the first gesture detection circuit GEDA determines that the second user USR2 has uttered sound, the first dictation circuit CGEA generates characters based on the sound information from the first microphone MICA, and the generated characters are displayed in such a manner as to be directed toward the first user USR1 on the transparent display DSP by the drawing information generation circuit DIG.

A description is given as an operation flow of the display device 100 on the basis of Steps S10 to S16 with reference to FIG. 5.

S10: The line-of-sight position of the first user USR1 is detected by the second user coordinate calculation circuit COCB on the basis of the image captured by the second camera CAMB.

S11: The face coordinate position of the second user USR2 is detected by the first user coordinate calculation circuit COCA on the basis of the image captured by the first camera CAMA.

S12: The gesture or the expression of the face of the second user USR2 is detected by the first gesture detection circuit GEDA on the basis of the image captured by the first camera CAMA.

S13: When it is determined in S12 that the second user USR2 is speaking, the first dictation circuit CGEA generates characters based on the sound information of the words that are spoken by the second user USR2 and are detected by the first microphone MICA.

S14: In the case in which the characters are generated in S13, the first keyword detection circuit KWDA recognizes and detects a keyword or a context for the characters generated by the first dictation circuit CGEA.

S15: The drawing information generation circuit DIG generates drawing information to be displayed on the transparent display DSP, on the basis of S10 to S14.

S16: The drawing information generation circuit DIG outputs the generated drawing information to the transparent display DSP. As a result, such display as those illustrated in FIG. 2 and FIG. 3 can be executed on the transparent display DSP. After the end of S16, the processing returns to S10, and an operation for next display is executed.

Figure 7:
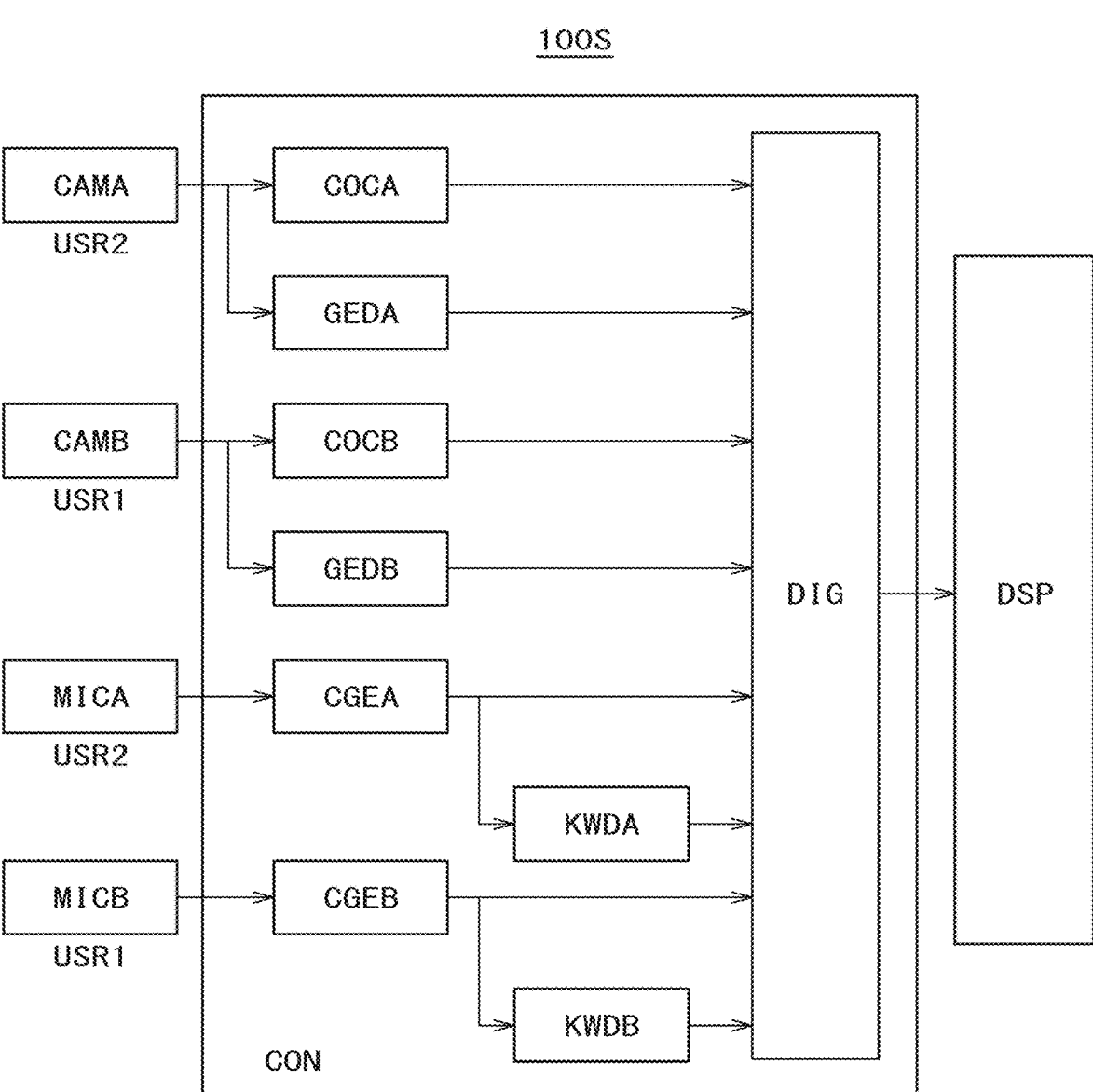
FIG. 7 is an overall block diagram of the display device according to the embodiment.

A description is given as another embodiment (example) of the present disclosure with reference to FIGS. 6, 7, and 8. FIG. 6 is a view for describing an overall configuration example of a display device according to the embodiment. FIG. 7 is an overall block diagram of the display device according to the embodiment. FIG. 8 is a flowchart for describing an operation flow of the display device according to the embodiment.

A display device 100S illustrated in FIG. 6 is different from the display device 100 of FIG. 1 in such a point that a second microphone MICB for detecting sound of the first user USR1 is added. The control circuit CON can detect the position coordinates of the face of the second user USR2 and the line of sight of the second user USR2 on the basis of the image of the second user USR2 captured by the first camera CAMA. Moreover, the control circuit CON can detect the position coordinates of the face of the first user USR1 and the line of sight of the first user USR1 on the basis of the image of the first user USR1 captured by the second camera CAMB. Further, the control circuit CON includes a second dictation circuit (corresponding to CGEB of FIG. 7 described later) which generates characters based on sound information from the second microphone MICB, and displays the generated characters in such a manner as to be directed toward the second user USR2 on the transparent display DSP.

The control circuit CON illustrated in FIG. 7 is different from the control circuit CON illustrated in FIG. 4 in such a point that a second gesture detection circuit GEDB electrically connected to the second camera CAMB is provided and such a point that a second dictation circuit CGEB electrically connected to the second microphone MICB and a second keyword detection circuit KWDB are provided. The other configuration and effects of the control circuit CON illustrated in FIG. 7 are the same as the other configuration and the effects of the control circuit CON illustrated in FIG. 4, and hence, a redundant description is omitted.

The second gesture detection circuit GEDB can detect a gesture or an expression of the face of the first user USR1 on the basis of the image of the first user USR1 captured by the second camera CAMB. Moreover, the second gesture detection circuit GEDB can determine whether or not the first user USR1 is uttering sound. The second gesture detection circuit GEDB can be configured to have a machine learning function (AI).

The second dictation circuit CGEB is electrically connected to the second microphone MICB and can generate characters (character information) based on sound information of words that are spoken by the first user USR1 and are detected by the second microphone MICB. The second keyword detection circuit KWDB can recognize and detect a keyword or a context for the characters generated by the second dictation circuit CGEB.

The drawing information generation circuit DIG is further electrically connected to the second gesture detection circuit GEDB, the second dictation circuit CGEB, and the second keyword detection circuit KWDB. To the drawing information generation circuit DIG, a detection result of the second gesture detection circuit GEDB, the characters generated by the second dictation circuit CGEB, and a detection result of the second keyword detection circuit KWDB are further input. The drawing information generation circuit DIG generates drawing information to be drawn on the transparent display DSP, on the basis of the input detection results and characters, and transmits the generated drawing information to the transparent display DSP. As a result, for example, display of characters directed toward the first user USR1 and display of characters directed toward the second user USR2 as described with reference to FIG. 2 and FIG. 3 can be executed on the transparent display DSP.

Thus, when the transparent display DSP of the display device 100S is used in the face-to-face manner, it is possible to provide a technology which achieves the face-to-face communication through use of the augmented reality. That is, it is possible to detect the speaking party of the first user USR1 and the second user USR2 by the microphone (MICA or MICB) and to use the augmented reality to display the display information such as characters or emotion at an appropriate position of the user of the speaking party on the transparent display DSP as viewed from the user of the non-speaking party.

A description is given as the operation flow of the display device 100S with reference to FIG. 8. It is to be noted that S10 to S14 are the same as those of FIG. 5, and hence, a redundant description is omitted. For S15 and S16, only portions different from those of FIG. 5 are described. A description is given as Steps S20 to S26.

S20: The control circuit CON determines whether or not the second user USR2 is uttering. This determination can be made by, for example, the first gesture detection circuit GEDA detecting the gesture or the expression of the face of the second user USR2 on the basis of the image captured by the first camera CAMA, or by the second gesture detection circuit GEDB detecting the gesture or the expression of the face of the first user USR1 on the basis of the image captured by the second camera CAMB. In the case of such a determination that the second user USR2 is speaking, the operation of the control circuit CON transitions to S10. In the case of such a determination that the first user USR1 is speaking, the operation of the control circuit CON transitions to S22.

In the case of the transition to S10, as described in FIGS. 5, S10 to S16 are executed, and the operation of the control circuit CON again transitions to S20 after the execution of S16.

A description is given as the operation of the control circuit CON in the case of the transition to S22. S22: The line-of-sight position of the second user USR2 is detected by the first user coordinate calculation circuit COCA on the basis of the image captured by the first camera CAMA.

S23: The face coordinate position of the first user USR1 is detected by the second user coordinate calculation circuit COCB on the basis of the image captured by the second camera CAMB.

S24: The gesture or the expression of the face of the first user USR1 is detected by the second gesture detection circuit GEDB on the basis of the image captured by the second camera CAMB.

S25: When it is determined in S24 that the first user USR1 is speaking, the second dictation circuit CGEB generates characters based on the sound information of the words that are spoken by the first user USR1 and are detected by the second microphone MICB.

S26: In the case in which the characters are generated in S25, the second keyword detection circuit KWDB recognizes and detects a keyword or a context for the characters generated by the second dictation circuit CGEB.

S15: The drawing information generation circuit DIG generates drawing information that is directed toward the second user USR2 and that is to be displayed on the transparent display DSP, on the basis of S22 to S26.

S16: The drawing information generation circuit DIG outputs the generated drawing information to the transparent display DSP. As a result, display directed toward the second user USR2, such as those illustrated in FIG. 2 and FIG. 3, can be executed on the transparent display DSP. After the end of S16, the operation of the control circuit CON returns to S20, and an operation for next display is executed.

Accordingly, when the transparent display DSP is used in the face-to-face manner, the face-to-face communication through use of the augmented reality can be achieved.

Figure 9:
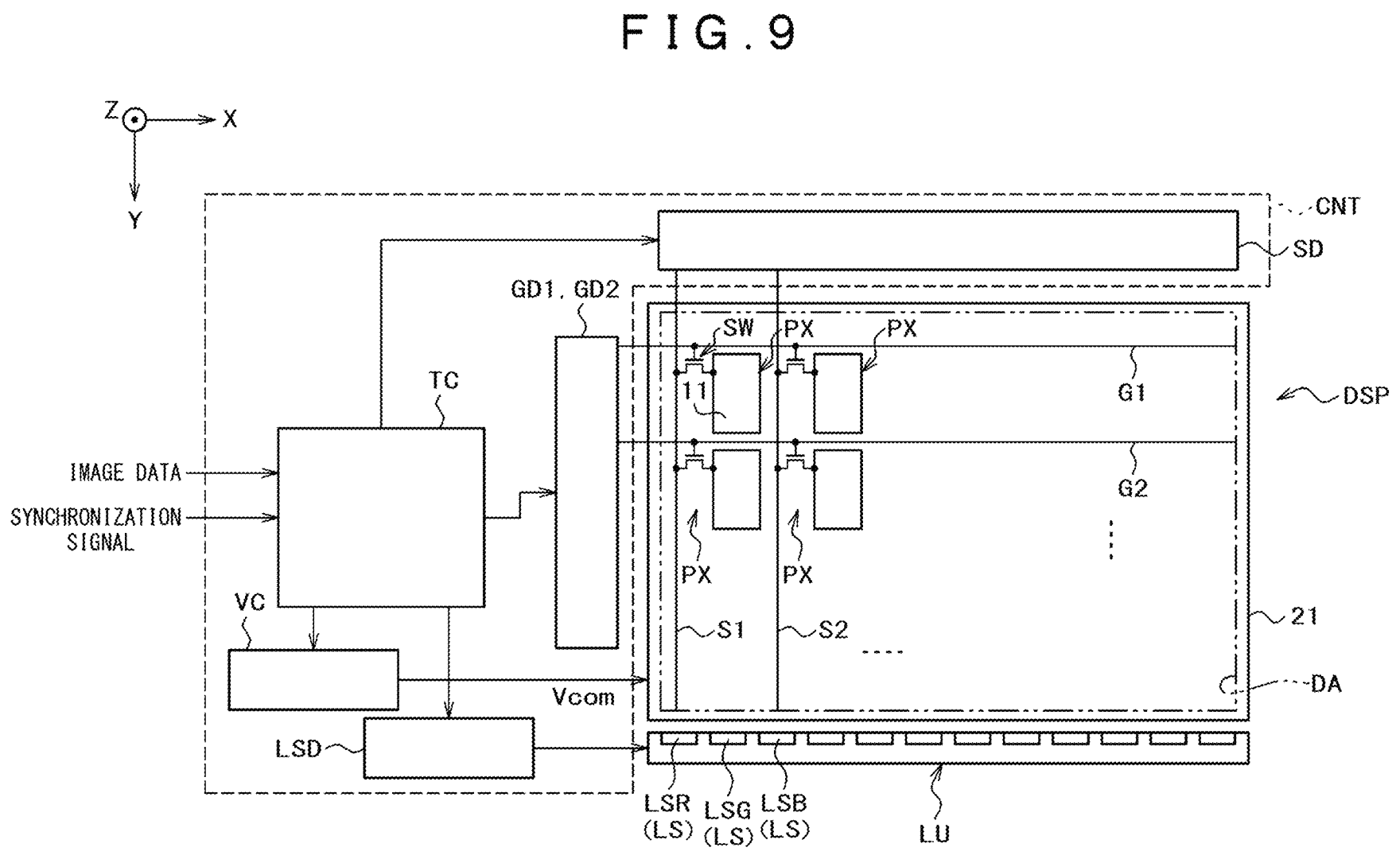
Figure 10:
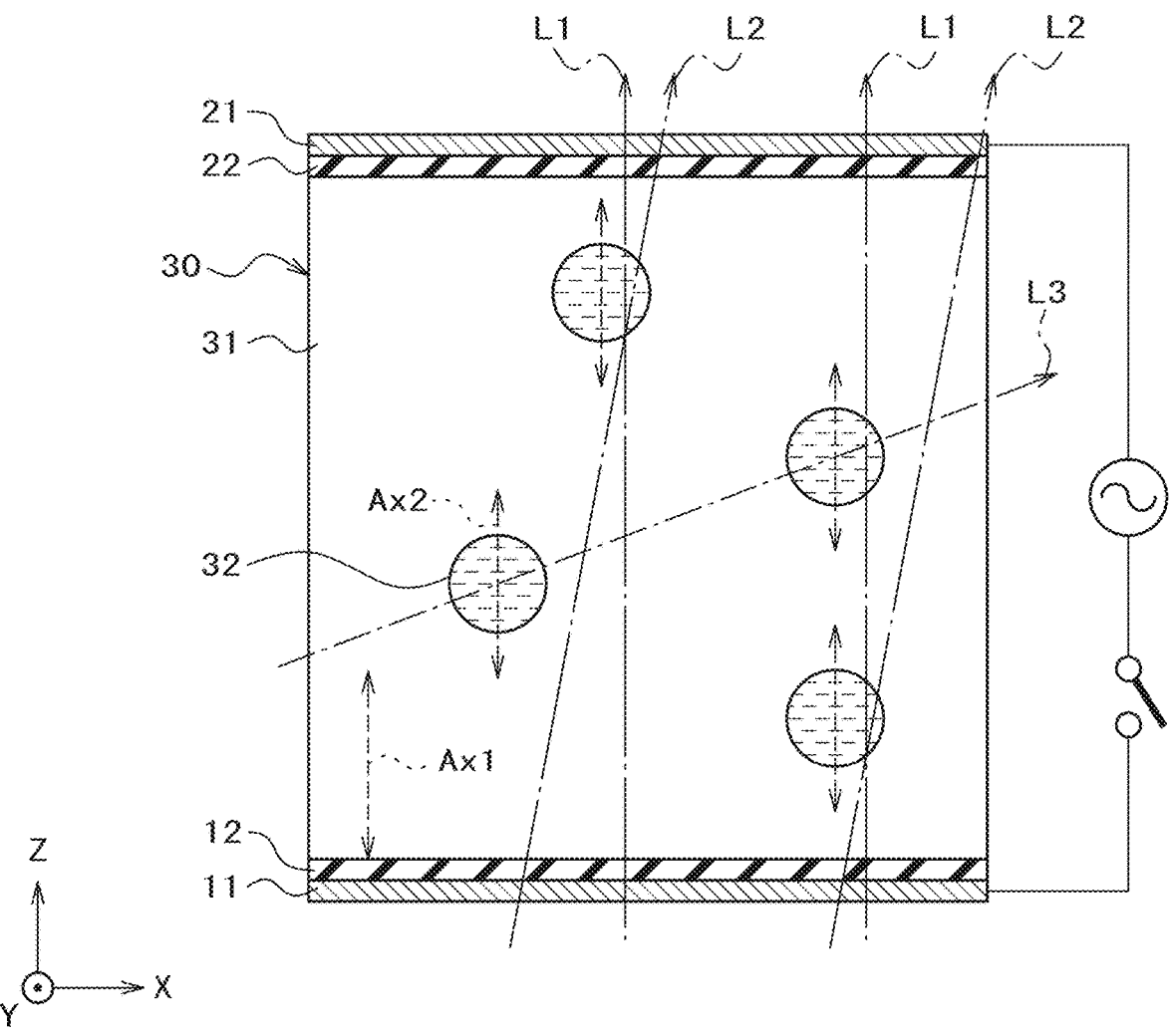
FIG. 10 is a view for schematically illustrating a liquid crystal layer in a transparent state.
Figure 11:
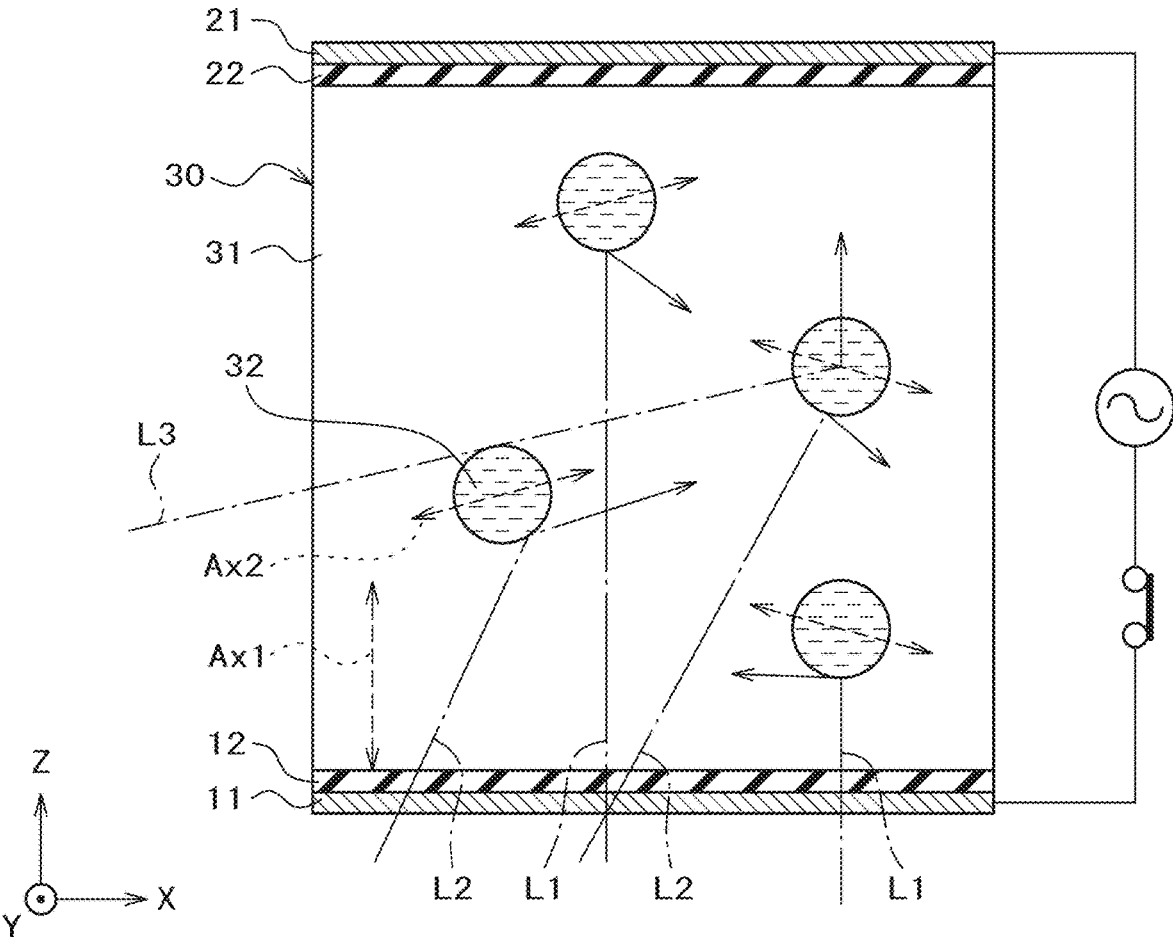
FIG. 11 is a view for schematically illustrating the liquid crystal layer in a scattering state.
Figure 12:
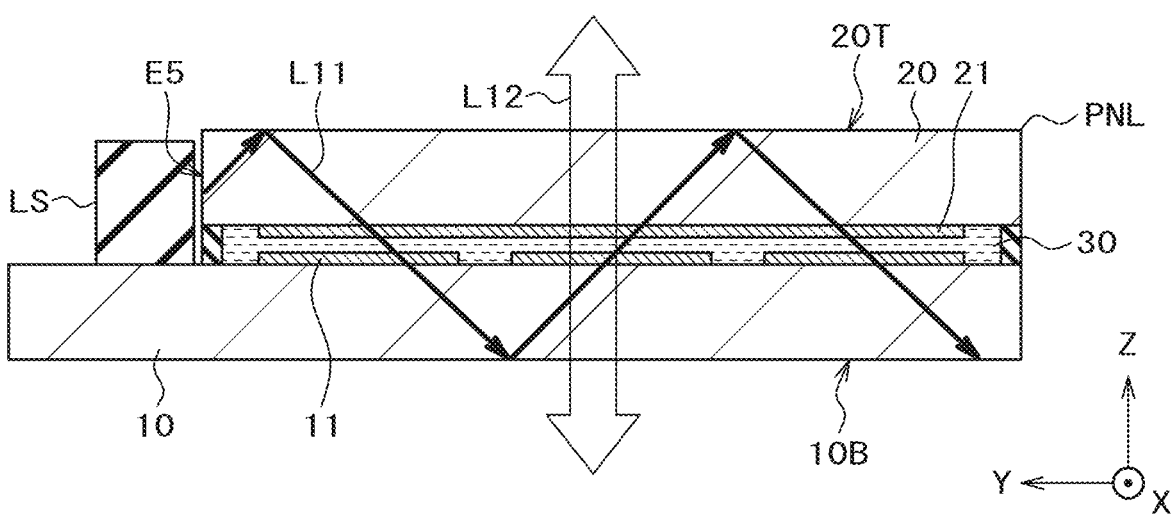
FIG. 12 is a cross sectional view for illustrating a display panel in the case in which the liquid crystal layer is in the transparent state.
Figure 13:
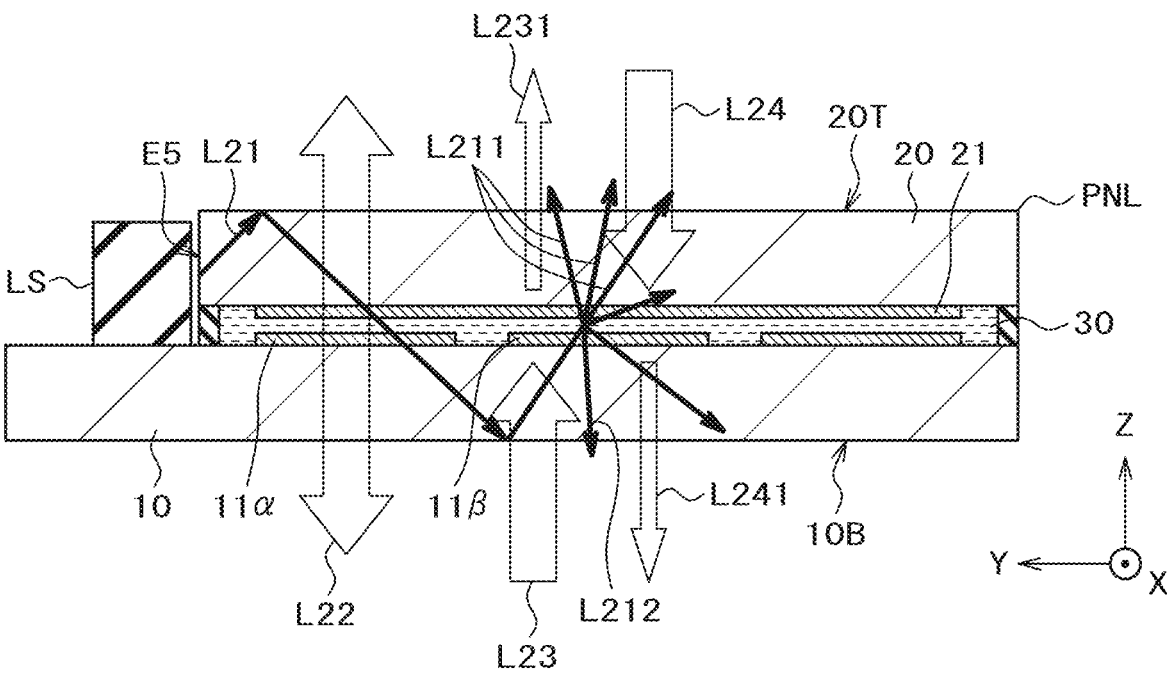
FIG. 13 is a cross sectional view for illustrating the display panel in the case in which the liquid crystal layer is in the scattering state.

A description is given as a configuration example of the transparent display DSP with reference to FIG. 9 to FIG. 13. FIG. 9 is a diagram for illustrating main components of the transparent display. FIG. 10 is a view for schematically illustrating a liquid crystal layer in a transparent state. FIG. 11 is a view for schematically illustrating the liquid crystal layer in a scattering state. FIG. 12 is a cross sectional view for illustrating the display panel in the case in which the liquid crystal layer is in the transparent state. FIG. 13 is a cross sectional view for illustrating the display panel in the case in which the liquid crystal layer is in the scattering state.

As illustrated in FIG. 9, the transparent display DSP includes a controller CNT indicated as a broken line in the diagram. The controller CNT includes a timing controller TC, gate drivers GD1 and GD2, a source driver SD, a Vcom circuit VC, a light source driver LSD, and the like.

The timing controller TC generates various signals on the basis of image data, a synchronization signal, and the like input from the outside. In one example, the timing controller TC outputs, to the source driver SD, a video signal generated through predetermined signal processing on the basis of the image data. Moreover, the timing controller TC outputs a control signal generated on the basis of the synchronization signal to each of the gate drivers GD1 and GD2, the source driver SD, the Vcom circuit VC, and the light source driver LSD. Details of the timing controller TC are described later.

A display area DA indicated by a two-dot chain line in the diagram includes a plurality of pixels PX. Each pixel PX includes a switching element SW and a pixel electrode 11. The switching element SW includes, for example, a thin film transistor. The switching element SW is electrically connected to a scanning line G and a signal line S. The plurality of pixel electrodes 11 are disposed in the display area DA and are provided in a matrix form. Thus, for example, the plurality of pixel electrodes 11 are provided in a plurality of rows. Each pixel electrode 11 is connected to the signal line S via the switching element SW. A common electrode 21 is positioned in the display area DA. The common electrode 21 faces the plurality of pixel electrodes 11. It is to be noted that the common electrode 21 may have such a configuration that the common electrode 21 is partitioned for each unit including at least one pixel PX, each partition is connected to a common line, and a common voltage is applied to the partitions, which is different from the present embodiment. To each scanning line G, a scanning signal is supplied from the gate driver GD1 or GD2. To each signal line S, a video signal (image signal) is supplied from the source driver SD. To the common electrode 21, a common voltage Vcom is supplied from the Vcom circuit VC. The video signal supplied to the signal line S is applied to the pixel electrode 11 connected to the switching element SW in a period in which this switching element SW is in a conduction state on the basis of the scanning signal supplied to the scanning line G. In a description given below, formation of an electric potential difference between the pixel electrode 11 and the common electrode 21 by supplying the video signal to the pixel electrode 11 is sometimes described as writing the video signal in (or applying a voltage to) the pixel PX provided with this pixel electrode 11.

A light source unit LU is configured to apply light in a color other than an achromatic color to a liquid crystal layer 30 described later. The light source unit LU includes light emitting elements LS in a plurality of colors. For example, the light source unit LU includes light emitting elements (first light emitting elements) LSR which apply light in a first color to the liquid crystal layer 30, light emitting elements (second light emitting elements) LSG which apply light in a second color to the liquid crystal layer 30, and light emitting elements (third light emitting elements) LSB which apply light in a third color to the liquid crystal layer 30. It should be understood that the first color, the second color, and the third color are colors different from one another. In the present embodiment, the first color is red, the second color is green, and the third color is blue. The light source driver LSD controls lighting periods of these light emitting elements LSR, LSG, and LSB. As detailed later, in a drive method in which one frame period has a plurality of sub-frame periods, at least one type of the three light emitting elements LSR, LSG, and LSB turns on in each sub-frame, and a color of illumination light is switched in each sub-frame.

A description is given as a configuration example of the transparent display DSP having the liquid crystal layer 30 being a polymer dispersed liquid crystal layer. The liquid crystal layer 30 uses reverse mode polymer dispersed liquid crystal (R-PDLC). FIG. 10 is a view for schematically illustrating the liquid crystal layer 30 in the transparent state.

As illustrated in FIG. 10, the liquid crystal layer 30 contains liquid crystal polymer 31 and liquid crystal molecules 32. The liquid crystal polymer 31 is obtained by, for example, polymerizing a liquid crystal monomer in a state in which the liquid crystal monomer is aligned in a predetermined direction by an alignment restriction force of alignment layers 12 and 22. The liquid crystal molecules 32 are dispersed in the liquid crystal monomer and are aligned in a predetermined direction depending on the alignment direction of the liquid crystal monomer when the liquid crystal monomer is polymerized. It is to be noted that the alignment layers 12 and 22 may be horizontal alignment films that align the liquid crystal monomer and the liquid crystal molecules 32 along an X-Y plane defined by a first direction X and a second direction Y or may be vertical alignment layers that align the liquid crystal monomer and the liquid crystal molecules 32 along a third direction Z.

The liquid crystal molecules 32 may be of a positive type having positive dielectric anisotropy or of a negative type having negative dielectric anisotropy. The liquid crystal polymer 31 and the liquid crystal molecules 32 have optical anisotropy of levels equivalent to each other. As another example, the liquid crystal polymer 31 and the liquid crystal molecules 32 have refractive anisotropy of levels substantially equivalent to each other. That is, the liquid crystal polymer 31 and the liquid crystal molecules 32 have ordinary ray refractive indices and extraordinary ray refractive indices substantially equivalent to each other. It is to be noted that, regarding both the ordinary ray refractive index and the extraordinary ray refractive index, the liquid crystal polymer 31 and the liquid crystal molecules 32 are not required to have values completely matching each other, and a difference due to manufacturing errors and the like is permitted. Moreover, the liquid crystal polymer 31 and the liquid crystal molecules 32 are different from each other in responsiveness to an electric field. That is, the responsiveness of the liquid crystal polymer 31 to the electric field is lower than the responsiveness of the liquid crystal molecules 32 to the electric field.

The example illustrated in FIG. 10 corresponds to, for example, a state in which a voltage is not applied to the liquid crystal layer 30 (the electric potential difference between the pixel electrode 11 and the common electrode 21 is zero) or a state in which a second transparent voltage described later is applied to the liquid crystal layer 30.

As illustrated in FIG. 10, an optical axis Ax1 of the liquid crystal polymer 31 and an optical axis Ax2 of the liquid crystal molecule 32 are parallel to each other. In the illustrated example, the optical axes Ax1 and Ax2 are both parallel to the third direction Z. The optical axis here corresponds to a line that is parallel to a travel direction of such a light beam that the refractive index is one value regardless of a polarization direction.

As described above, the liquid crystal polymer 31 and the liquid crystal molecules 32 have refractive anisotropy of levels substantially equivalent to each other, and the optical axes Ax1 and Ax2 are parallel to each other. Thus, there is almost no difference in refractive index between the liquid crystal polymer 31 and the liquid crystal molecules 32 in all directions including the first direction X, the second direction Y, and the third direction Z. Hence, light L1 incident on the liquid crystal layer 30 in the third direction Z is transmitted substantially without being scattered in the liquid crystal layer 30. The liquid crystal layer 30 can maintain the parallelism of the light L1. Similarly, each of light L2 and light L3 incident in an oblique direction inclined with respect to the third direction Z is hardly scattered in the liquid crystal layer 30. As a result, high transparency is obtained. The state illustrated in FIG. 10 is referred to as the "transparent state."

FIG. 11 is a view for schematically illustrating the liquid crystal layer 30 in the scattering state. As illustrated in FIG. 11, as described before, the responsiveness of the liquid crystal polymer 31 to the electric field is lower than the responsiveness of the liquid crystal molecules 32 to the electric field. Thus, in a state in which a voltage (scattering voltage described later) which is higher than each of the second transparent voltage described before and a first transparent voltage described later is applied to the liquid crystal layer 30, the alignment direction of the liquid crystal polymer 31 hardly changes while the alignment direction of the liquid crystal molecules 32 changes according to the electric field. That is, as illustrated in the drawing, the optical axis Ax1 is substantially parallel to the third direction Z while the optical axis Ax2 is inclined with respect to the third direction Z. Therefore, the optical axes Ax1 and Ax2 cross each other. As a result, in all directions including the first direction X, the second direction Y, and the third direction Z, a large difference in refractive index occurs between the liquid crystal polymer 31 and the liquid crystal molecules 32. Accordingly, the light L1, the light L2, and the light L3 incident on the liquid crystal layer 30 are scattered in the liquid crystal layer 30. The state illustrated in FIG. 11 is referred to as the "scattering state."

A control section switches the liquid crystal layer 30 to at least one of the transparent state and the scattering state.

FIG. 12 is a cross sectional view for illustrating a display panel PNL in a case in which the liquid crystal layer 30 is in the transparent state. As illustrated in FIG. 12, illumination light L11 emitted from a light emitting element LS enters the display panel PNL from an end portion E5 and propagates through a transparent substrate 20, the liquid crystal layer 30, a transparent substrate 10, and the like. In the case in which the liquid crystal layer 30 is in the transparent state, the illumination light L11 is hardly scattered in the liquid crystal layer 30, and thus it hardly leaks out from a bottom surface 10B of the transparent substrate 10 and a top surface 20T of the transparent substrate 20.

External light L12 incident on the display panel PNL is transmitted substantially without being scattered in the liquid crystal layer 30. That is, the external light incident on the display panel PNL from the bottom surface 10B is transmitted to the top surface 20T, and the external light incident from the top surface 20T is transmitted to the bottom surface 10B. Therefore, when a user observes the display panel PNL from the top surface 20T side, the user can visually recognize the background on the bottom surface 10B side through the display panel PNL. Similarly, when the user observes the display panel PNL from the bottom surface 10B side, the user can visually recognize the background on the top surface 20T side through the display panel PNL.

FIG. 13 is a cross sectional view for illustrating the display panel PNL in a case in which the liquid crystal layer 30 is in the scattering state. As illustrated in FIG. 13, illumination light L21 emitted from the light emitting element LS is incident on the display panel PNL from the end portion E5 and propagates through the transparent substrate 20, the liquid crystal layer 30, the transparent substrate 10, and the like. In the illustrated example, the liquid crystal layer 30 between a pixel electrode 11α and the common electrode 21 (liquid crystal layer to which a voltage applied between the pixel electrode 11α and the common electrode 21 is applied) is in the transparent state, and hence, the illumination light L21 is hardly scattered in a region which is of the liquid crystal layer 30 and which faces the pixel electrode 11α. Meanwhile, the liquid crystal layer 30 between a pixel electrode 11β and the common electrode 21 (liquid crystal layer to which a voltage applied between the pixel electrode 11β and the common electrode 21 is applied) is in the scattering state, and hence, the illumination light L21 is scattered in a region which is of the liquid crystal layer 30 and which faces the pixel electrode 11β. Partial scattered light L211 of the illumination light L21 is released to the outside from the top surface 20T, and partial scattered light L212 is released to the outside from the bottom surface 10B.

As with the external light L12 illustrated in FIG. 12, external light L22 incident on the display panel PNL is transmitted substantially without being scattered in the liquid crystal layer 30 at a position overlapping the pixel electrode 11α. At a position overlapping the pixel electrode 11β, partial light L231 of external light L23 incident from the bottom surface 10B is scattered in the liquid crystal layer 30 and is then transmitted to the outside from the top surface 20T. Moreover, partial light L241 of external light L24 incident from the top surface 20T is scattered in the liquid crystal layer 30 and is then transmitted to the outside from the bottom surface 10B.

Therefore, when the display panel PNL is observed from the top surface 20T side, the color of the illumination light L21 can visually be recognized at the position overlapping the pixel electrode 11β. Moreover, since the partial external light L231 is transmitted through the display panel PNL, the background on the bottom surface 10B side can also visually be recognized through the display panel PNL. Similarly, when the display panel PNL is observed from the bottom surface 10B side, the color of the illumination light L21 can visually be recognized at the position overlapping the pixel electrode 11.

Moreover, since the partial external light L241 is transmitted through the display panel PNL, the background on the top surface 20T side can also visually be recognized through the display panel PNL. It is to be noted that, since the liquid crystal layer 30 is in the transparent state at the position overlapping the pixel electrode 11α, the color of the illumination light L21 is hardly visually recognized, and the background can visually be recognized through the display panel PNL.

A description is given as a configuration example of eye tracking with reference to FIG. 14. FIG. 14 is a schematic diagram of the configuration example of the eye tracking.

In FIG. 14, the positions of the eyes of the second user USR2 (first user USR1) are measured by the camera CAMA (CAMB), and data thereon is transferred to the first user coordinate calculation circuit COCA (second user coordinate calculation circuit COCB) serving as a position detector. Data on the position coordinates indicating the positions of the eyes is generated by the first user coordinate calculation circuit COCA (second user coordinate calculation circuit COCB), and this data is transferred to the drawing information generation circuit DIG. The drawing information generation circuit DIG calculates approximate position coordinates of the mouth of the second user USR2 (first user USR1) on the basis of the data on the position coordinates indicating the positions of the eyes. The drawing information generation circuit DIG sets the position of a speech balloon in which characters are to be displayed, on the basis of the calculated position coordinates of the mouth, thereby generating the drawing information, and transmits the generated drawing information to the transparent display DSP. As a result, for example, the speech balloon on the transparent display DSP can be drawn at the position of the mouth of the second user USR2 (first user USR1). Moreover, in a case in which the position of the mouth of the second user USR2 (first user USR1) on the transparent display DSP moves, the drawing position of the speech balloon can be moved in such a manner as to follow the moving position of the mouth of the second user USR2 (first user USR1). As a result, the display examples described with reference to FIG. 2 and FIG. 3 can be achieved on the transparent display DSP. Accordingly, when the transparent display DSP is used in the face-to-face manner, the face-to-face communication through use of the augmented reality can be achieved.

All display devices that can be embodied by a person skilled in the art appropriately modifying the design on the basis of the display devices described above as the embodiments of the present invention are also included in the scope of the present invention as long as these display devices include the gist of the present invention.

In the scope of the idea of the present invention, a person skilled in the art will be able to conceive various exemplary modifications and alternations, and it is understood that these exemplary modifications and alternations are also included in the scope of the present invention. For example, ones obtained by a person skilled in the art appropriately adding a component to, removing a component from, or modifying the design of the foregoing embodiments, or ones obtained by a person skilled in the art appropriately adding a process to, omitting a process of, or modifying the conditions for the process of the foregoing embodiments are also included in the scope of the present invention as long as the ones include the gist of the present invention.

In regard to the other operations and effects that are achieved by the aspects described in the embodiments, it is understood that ones apparent from the description of the present specification or ones appropriately conceivable by a person skilled in the art are naturally achieved by the present invention.

It is possible to form various inventions from appropriate combinations of a plurality of components disclosed in the foregoing embodiments. For example, some components may be removed from all the components described in the embodiments. Moreover, the components ranging over different embodiments may be appropriately combined.

What is claimed is:

1. A display device comprising:
a transparent display;
a first camera that captures an image of a first viewer present in a first normal direction of a display surface of the transparent display;
a second camera that captures an image of a second viewer present in a second normal direction of the display surface of the transparent display, the second normal direction being an opposite direction of the first normal direction;
a microphone; and
a control circuit that includes a user coordinate calculation circuit, a gesture detection circuit, a dictation circuit, and a drawing information generation circuit,
wherein the user coordinate calculation circuit specifies positions of the first viewer and the second viewer on a basis of the images from the first camera and the second camera,
the gesture detection circuit determines which of the first viewer and the second viewer is uttering sound, and,
when the gesture detection circuit determines that the first viewer utters sound, the dictation circuit generates a character based on sound information from the microphone, and the generated character is displayed on the transparent display toward the second viewer by the drawing information generation circuit.

2. The display device according to claim 1, wherein a display position of the generated character is outside position coordinates of the first viewer as viewed from the second viewer.

3. The display device according to claim 1, wherein the gesture detection circuit determines emotion from facial expressions of the first viewer and the second viewer and displays a content corresponding to the determined emotion of one of the viewers on the transparent display toward the other viewer.

4. The display device according to claim 1, wherein the transparent display is a display panel using polymer dispersed liquid crystal.

5. The display device according to claim 1, wherein the gesture detection circuit has a machine learning function.

* * * * *